US008995394B2

(12) United States Patent
Edara et al.

(10) Patent No.: US 8,995,394 B2
(45) Date of Patent: Mar. 31, 2015

(54) SYSTEM FOR FAST DORMANCY ON WIRELESS NETWORKS

(75) Inventors: Kiran K. Edara, Cupertino, CA (US); Siva Rama Kumar Somayajula, Palo Alto, CA (US)

(73) Assignee: Amazon Technologies, Inc., Reno, NV (US)

(*) Notice: Subject to any disclaimer, the term of this patent is extended or adjusted under 35 U.S.C. 154(b) by 179 days.

(21) Appl. No.: 13/525,112

(22) Filed: Jun. 15, 2012

(65) Prior Publication Data
US 2013/0336285 A1    Dec. 19, 2013

(51) Int. Cl.
| | |
|---|---|
| *H04W 4/00* | (2009.01) |
| *H04W 36/16* | (2009.01) |
| *H04W 52/02* | (2009.01) |
| *H04L 12/413* | (2006.01) |
| *H04W 36/00* | (2009.01) |
| *H04W 68/00* | (2009.01) |
| *H04W 36/14* | (2009.01) |
| *H04W 76/06* | (2009.01) |

(52) U.S. Cl.
CPC .............. *H04W 36/16* (2013.01); *H04W 36/14* (2013.01); *H04W 76/068* (2013.01); *H04W 52/0245* (2013.01)
USPC ............ 370/331; 370/466; 455/442; 455/458

(58) Field of Classification Search
CPC .................... H04W 36/0016; H04W 36/0033; H04W 36/0055; H04W 36/0083; H04W 36/0088; H04W 36/0094; H04W 36/06; H04W 36/10; H04W 36/14; H04W 36/30; H04W 48/20; H04W 56/001; H04W 72/02; H04J 11/0093

USPC ................ 370/331, 332, 338, 350, 466, 467; 455/436–439, 442, 458
See application file for complete search history.

(56) References Cited

U.S. PATENT DOCUMENTS

| | | | |
|---|---|---|---|
| 2002/0183053 A1* | 12/2002 | Gopalakrishna et al. ...... | 455/423 |
| 2004/0063431 A1* | 4/2004 | Julka et al. .................... | 455/436 |
| 2007/0281696 A1* | 12/2007 | Vikberg et al. ............... | 455/436 |
| 2009/0154386 A1* | 6/2009 | So et al. ........................ | 370/311 |
| 2010/0113010 A1* | 5/2010 | Tenny et al. ................... | 455/423 |
| 2010/0165975 A1* | 7/2010 | Lerzer et al. .................. | 370/350 |
| 2012/0069801 A1* | 3/2012 | Das et al. ....................... | 370/329 |
| 2012/0069823 A1* | 3/2012 | Low et al. ...................... | 370/335 |
| 2012/0190364 A1* | 7/2012 | Wu ................................ | 455/436 |

* cited by examiner

*Primary Examiner* — Xavier Szewai Wong
(74) *Attorney, Agent, or Firm* — Lowenstein Sandler LLP

(57) ABSTRACT

A method and apparatus for enabling fast dormancy on LTE wireless connections. In an example embodiment, a user device generates a signal strength measurement report upon receiving an indication that a data transfer via an active wireless connection with a first infrastructure node according to a first wireless communication standard, such as LTE, is complete. The user device submits the signal strength measurement report to the first infrastructure node to trigger a handover. The user device implements the handover to a second infrastructure node to yield a second wireless connection according to a second wireless communication standard, such as WCDMA. Upon completion of the handover to the second infrastructure node, the user device transmits to the second infrastructure node a request to release the second wireless connection.

20 Claims, 6 Drawing Sheets

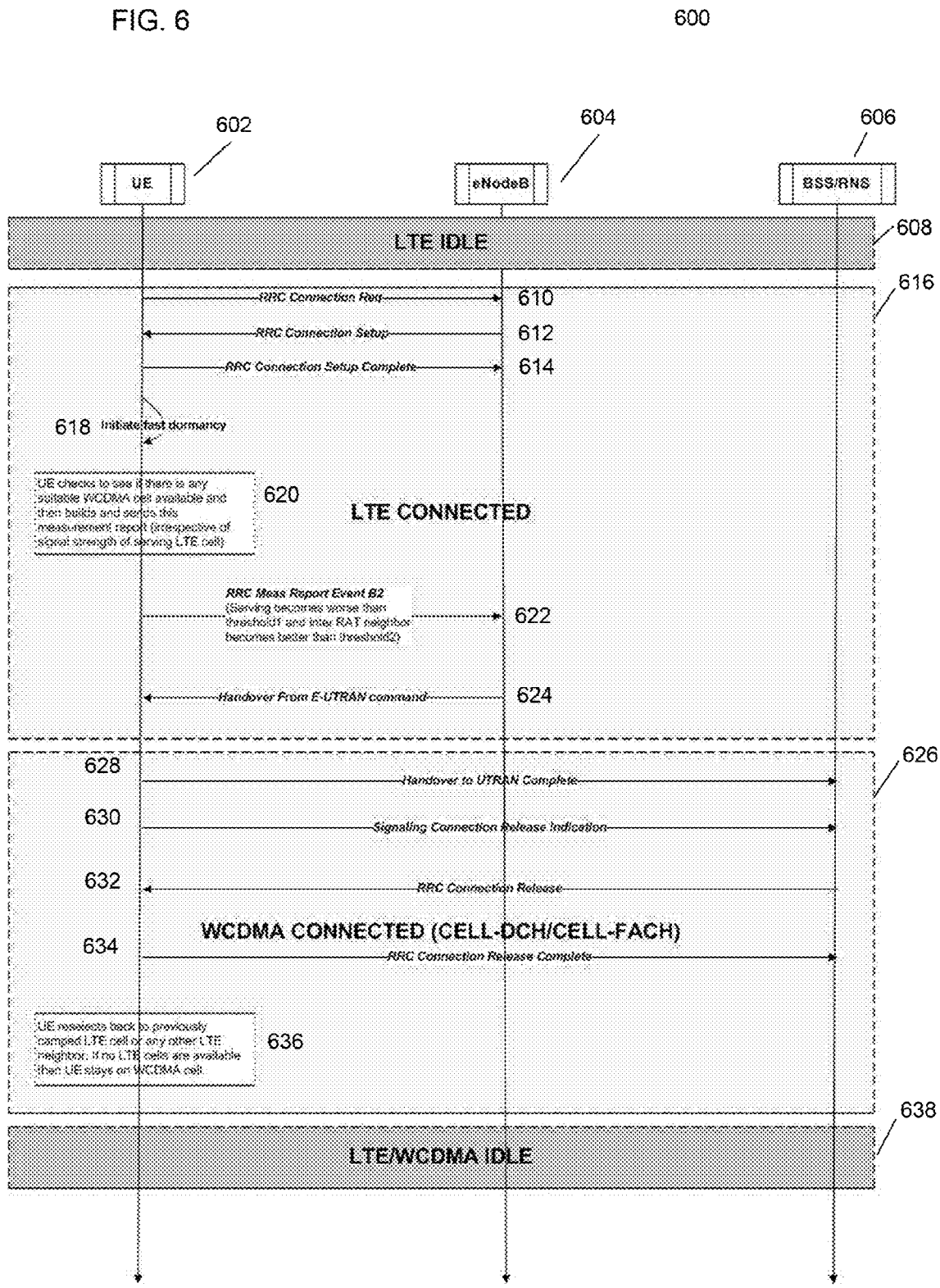

SYSTEM FOR FAST DORMANCY ON WIRELESS NETWORKS

BACKGROUND

Data connections for cellular communications are in transition from Code Division Multiple Access (CDMA) and Wideband Code Division Multiple Access (WCDMA) standards, colloquially known as 3G, to Long Term Evolution (LTE) standards, colloquially known as 4G. LTE generally offers a greater maximum throughput and lower latency for data transmissions. However, current LTE implementations incur significant energy costs for transmissions, leading to poor battery life for mobile LTE devices. While dual-band devices can switch between LTE and WCDMA, the device trades off either battery life or data transfer speed.

Wireless devices connecting to a WCDMA radio access network fall in to one of the following states: Cell-DCH, Cell-FACH, Cell/URA-PCH or Idle. The wireless device is in either Cell-DCH or Cell-FACH states when participating in an active data session (e.g., actively transmitting or receiving data via a network). These two states are high power consuming states, as the wireless device should keep its transmitter and receiver on while in these states in anticipation of transmitting or receiving data. Thus, whenever the wireless device is done transmitting/receiving data, the network operator typically moves the wireless device to one of the low power consuming states like Cell/URA-PCH or idle. The network operator may do this either based on a timer or upon receiving a signaling connection release indication (SCRI) message from the wireless device. This mechanism to release the signaling and radio resources on network and user side and moving the wireless device to low power consuming state is called fast dormancy. The network operator usually has control over the timer value and also the decision to release the connection upon receiving a SCRI message from the wireless device. Network operators are very careful with fast dormancy because any misuse by user devices can result in significant signaling traffic on network. SCRI is a feature of the CDMA and WCDMA wireless standards, but the faster LTE standard does not provide for such functionality, further exacerbating the problem of energy consumption for LTE devices.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 6 illustrates example interactions related to fast dormancy between a user device and two wireless networks, in accordance with some embodiments of the invention.

DETAILED DESCRIPTION

Figure 1:
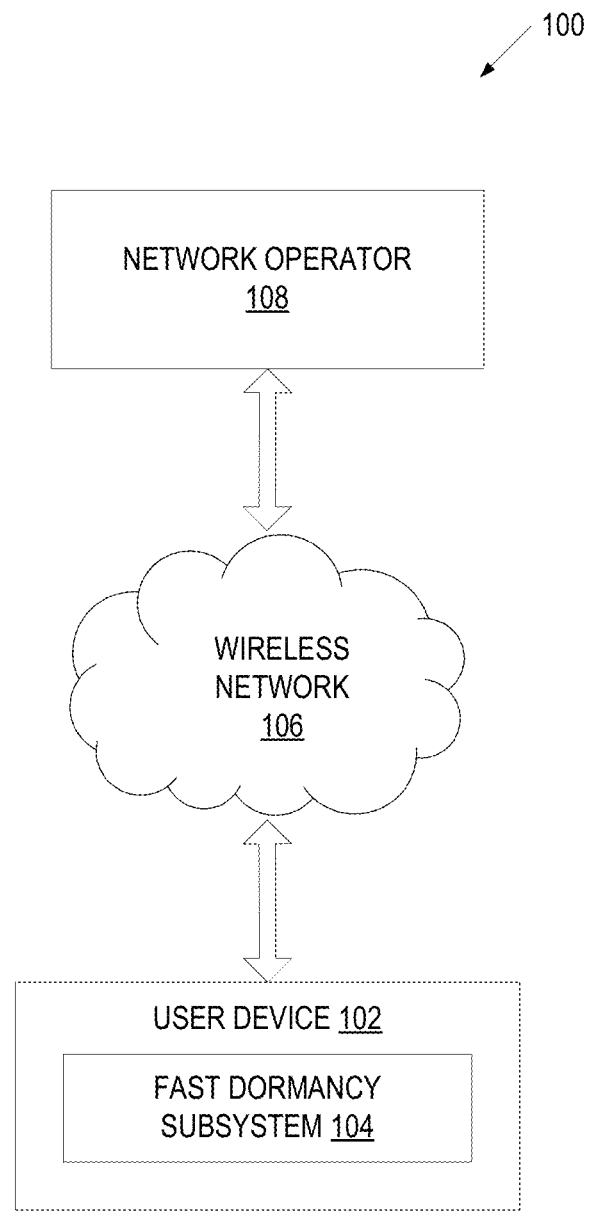
FIG. 1 illustrates an example network architecture.

Described herein are methods, systems, and non-transitory computer-readable storage media for implementing fast dormancy in LTE and WCDMA networks. The WCDMA standard allows user equipment, such as a user's cell phone, to release an active connection and enter an idle state. For example, when a user's smartphone completes a data transmission and is done using the WCDMA wireless interface, the smartphone can send an SCRI signal to the network to trigger fast dormancy and enter an idle state, thereby saving power. The LTE standard does not provide an equivalent mechanism to the SCRI signal of the WCDMA standard, causing LTE devices to wait for a dormancy timer to expire, which leaves the LTE transmitter and receiver active longer than is necessary.

Consider the following example. First, the user starts a browser session while camped on WCDMA cell. Second, the user device sends a radio resource control (RRC) connection request to the network to request dedicated resources to transmit and receive browser data. Third, the network operator responds to the RRC connection request and allocates radio resources to the user device. Fourth, the user finishes browsing and exits the browser session. Fifth, the user device sends an SCRI signal to release the RRC connection and the network operator responds with RRC connection release and releases all radio resources and the user device now moves to idle mode. Sixth, typically within a couple of seconds of sending the SCRI signal, an email client application wants to transmit data to synchronize with the server. Then, the user device now should repeat the second, third, fourth, and fifth steps above. Considering the different kinds of applications that try to synchronize asynchronously with servers on the typical smart phone, the signaling traffic load on the network for such devices can be very high.

To reduce these problems, network operators added the following changes to the 3GPP release 8 specification. Prior to release 8, when camped on WCDMA (3G), user devices could send an SCRI message and wait for certain time for an RRC connection release. If there was no response from the network, user devices could autonomously release the signaling connection. Release 8 introduced a new cause called 'UE Requested PS Data session end' to SCRI, and a procedure to start a dialogue with the network. User devices now cannot send SCRI and autonomously release the radio connection; instead they should keep the signaling connection active until network sends an RRC connection release message. Also a timer value is broadcast to user devices in a system information message which tells how often user devices can send SCRI messages to network.

The LTE (4G) standard removes SCRI messages, without providing any other mechanism for user devices to request the network to move from connected to idle mode (Unlike in WCDMA, LTE does not have Cell-DCH, Cell-FACH, Cell/URA-PCH, idle states, instead LTE uses only 2 states—connected and idle). This is an intentional part of the LTE standard, providing network operators complete control over fast dormancy.

In one example embodiment, when a user device is camped on (has selected) an LTE cell and does not have any data to send, the user device creates and sends a signaling message to the network operator, requesting a handover from LTE to WCDMA. Once the user device moves to WCDMA, the user device uses existing fast dormancy mechanisms, such as sending an SCRI signal in WCDMA. For example, when the user device is in LTE-Connected state and does not have any data to transmit, the user device checks for an available WCDMA cell and builds a measurement report to send to the network. In one embodiment, the user device generates this measurement report irrespective of signal strength of the serving LTE cell, e.g., even if the signal strength of the LTE serving cell is stronger than the signal strength of the available WCDMA cell. The measurement report artificially triggers the handover from LTE, which does not have a fast dormancy mechanism, to WCDMA, which has a fast dormancy mechanism. The measurement report can include, for example, one or more of accurate measurements, previously gathered measurements that are no longer relevant, fabricated measurements, or default measurements.

In one embodiment, upon receiving the measurement report(s) from the user device, the network operator initiates a handover to the WCDMA cell. After a successful handover to WCDMA, the user device sends a SCRI signal to the network, similar to how the user device would act when in WCDMA CELL-DCH or CELL-FACH state. Upon receiving the SCRI signal, the network operator may either respond with an RRC connection release or leave the user device in a connected state. If there is no response to the SCRI signal, the user device can send another SCRI signal after a timeout. If the user device receives the RRC connection release, the user device may respond with RRC connection release complete, and release all radio and signaling resources and move out of the WCDMA connected state. As part of getting out of a WCDMA connected state, the user device can check if the previously camped LTE cell is still suitable or if any other suitable LTE cell is available to camp on. If an LTE cell is available, the user device can camp on that LTE cell or on the LTE cell and the WCDMA cell. If no LTE cell is available, the user device can remain in idle mode on the WCDMA cell.

FIG. 1 illustrates an example network architecture 100 for fast dormancy on LTE and WCDMA networks or other networks. A user device 102 having a fast dormancy subsystem 104 communicates with a network operator 108 via a wireless network 106. The user device can communicate with the wireless network 106 using at least 2 wireless communication standards, such as WCDMA and LTE. When communicating according to LTE with the wireless network, the user device 102 can detect that the data transmission or communication is complete. The user device 102 can optionally calculate how much time is remaining for the LTE timeout which would trigger a release of the LTE connection, and if the time remaining is above a threshold, the fast dormancy subsystem 104 can be triggered or engaged. In another embodiment, the fast dormancy subsystem 104 is triggered or engaged when the data transmission is complete regardless of a time remaining for an LTE timeout. The type of wireless interface between the wireless network 106 and the user device 102 may not impact the substance of communications between the user device 102 and the network operator 108. For example, the user device 102 can communicate through LTE, WCDMA, or other wireless networking technologies.

The user device 102 may be any type of wireless user device such as an electronic book reader, a personal digital assistant (PDA), a mobile phone, a laptop computer, a portable media player, a tablet computer, an electronic pad, a desktop computer, a camera, a video camera, a netbook, and the like. The user device 102 can include one or more processors, such as one or more CPUs, microcontrollers, field programmable gate arrays, or other types of processors. The user device 102 can also include system memory, which may correspond to any combination of volatile and/or non-volatile storage mechanisms. The system memory and/or firmware can store information which provides an operating system component, various program modules such as the fast dormancy subsystem 104. The user device 102 performs functions by using the processor(s) to execute instructions provided by the system memory.

The user device 102 can also include a data storage device that may be composed of one or more types of removable storage and/or one or more types of non-removable storage. The data storage device can include a computer-readable storage medium on which is stored one or more sets of instructions embodying any one or more of the methodologies or functions described herein. For example, instructions for the fast dormancy subsystem 104 may reside, in whole or in part, within the computer readable storage medium, system memory and/or within the processor(s) during execution thereof by the user device 102, the system memory and the processor(s) also constituting computer-readable media. The user device 102 may also include one or more input devices (keyboard, mouse device, specialized selection keys, touch screen, global positioning system (GPS) receiver, accelerometers, gyroscopes, and so forth) and one or more output devices (displays, printers, audio output mechanisms, components that vibrate, and so forth).

The user device 102 also includes a wireless modem or other wireless network communication component to allow the user device 102 to communicate via the network 106 with the network operator 108. The network communication component may allow the user device 102 to handle both voice and non-voice communications (such as communications for text messages, multimedia messages, media downloads, web browsing, etc). The network communication component may provide network connectivity using any type of network technology. For wireless communications, the network communication component can generate signals and send these signals to power amplifier for amplification, after which they are wirelessly transmitted via an antenna. In addition to sending data, the antenna can also receive data which can be transferred to the processor(s). The network operator 108 typically involves a set of wireless antennas and transceivers for operating a cellular or other wireless network. The network operator 108 can include other various network infrastructure nodes, such as switches, routers, hubs, network bridges, servers, network links, and so forth. The network operator 108 can also include components that provide services relating to security, encryption, traffic shaping, and so forth. The network operator 108 can include servers, test equipment, diagnostic equipment, etc. The network operator 108 allows wireless mobile and non-mobile user devices to connect to network resources.

In one embodiment, the user device 102 hosts a fast dormancy subsystem 104. Some embodiments of the fast dormancy subsystem 104 will be discussed in more detail below in conjunction with FIG. 2.

Figure 2:
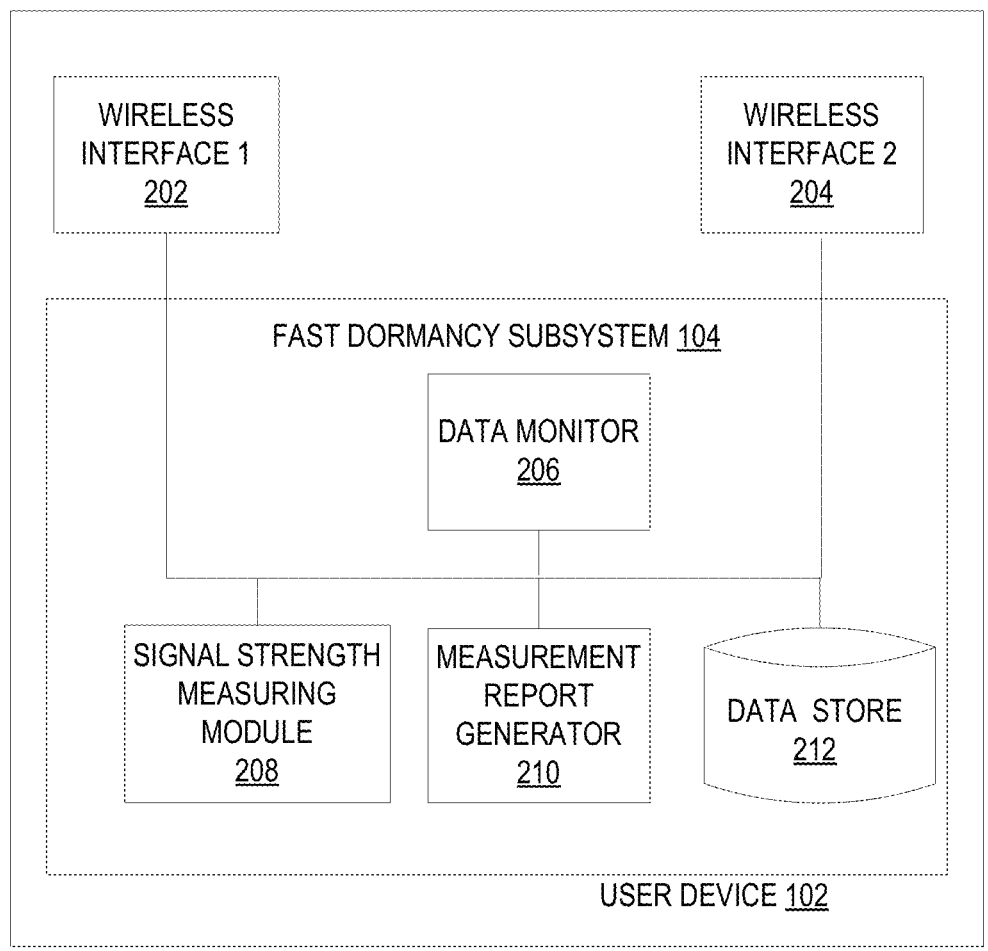
FIG. 2 illustrates a block diagram of one embodiment of a fast dormancy subsystem.

FIG. 2 illustrates a block diagram of one embodiment of the fast dormancy subsystem 104 hosted by the user device 102. The user device 102 includes two wireless interfaces 202, 204, such as a WCDMA wireless interface and an LTE wireless interface, but other wireless technologies can be substituted for these two example interfaces. The descriptions herein use WCDMA and LTE as examples, but are not limited to those wireless standards. The fast dormancy subsystem 104 can include a data monitor 206. The data monitor 206 determines when the user device 102 has completed using a wireless connection. For example, if an email application initiated the wireless data connection in order to send an email message, the data monitor 206 can detect that the email message has been sent successfully and no more emails are currently queued to be sent. The data monitor 206 can coordinate data transmission needs of one or more software applications as well as the operating system or other components of the user device 102. When use of the wireless connection is complete, the measurement report generator 210 generates a signal measurement report which, when sent to a wireless network node, such as an LTE eNodeB, triggers a handover to a WCDMA network node. The measurement report generator 210 can trigger the signal strength monitoring module 208 to measure actual signal strengths of one or more of the LTE and the WCDMA networks. Typically the measurement report is only sent when a cell belonging to another radio access technology has a stronger signal than the current serving cell. However, in some embodiment of the present disclosure, the measurement report is sent regardless of signal strength and is used as a way to initiate a handover from LTE, in which the user device is unable to autonomously enter an idle state, to WCDMA, in which the user device can autonomously enter an idle state.

The measurement report generator 210 can base the report on actual measurements from the signal strength measuring module 208 or can generate fake data, simulated data, or other data that is not reflective of actual signal strengths. For example, the wireless network may not trigger a handoff from one network to another unless the difference in signal strengths is above a threshold. The measurement report generator 210 can adjust or modify the measurements in the report so as to meet or exceed that threshold and trigger a handoff. The data store 212 can contain previously recorded measurements, which the measurement report generator 210 can use in place of actual measurements.

After the measurement report is generated, the fast dormancy subsystem 104 sends the measurement report to the LTE wireless network, which triggers a handover to the WCDMA wireless network. Upon a successful handover, the fast dormancy subsystem 104 sends to the WCDMA wireless network an SCRI signal to enter an idle state. The user device 102 can enter an idle state with the WCDMA wireless network or with the LTE network.

Figure 3:
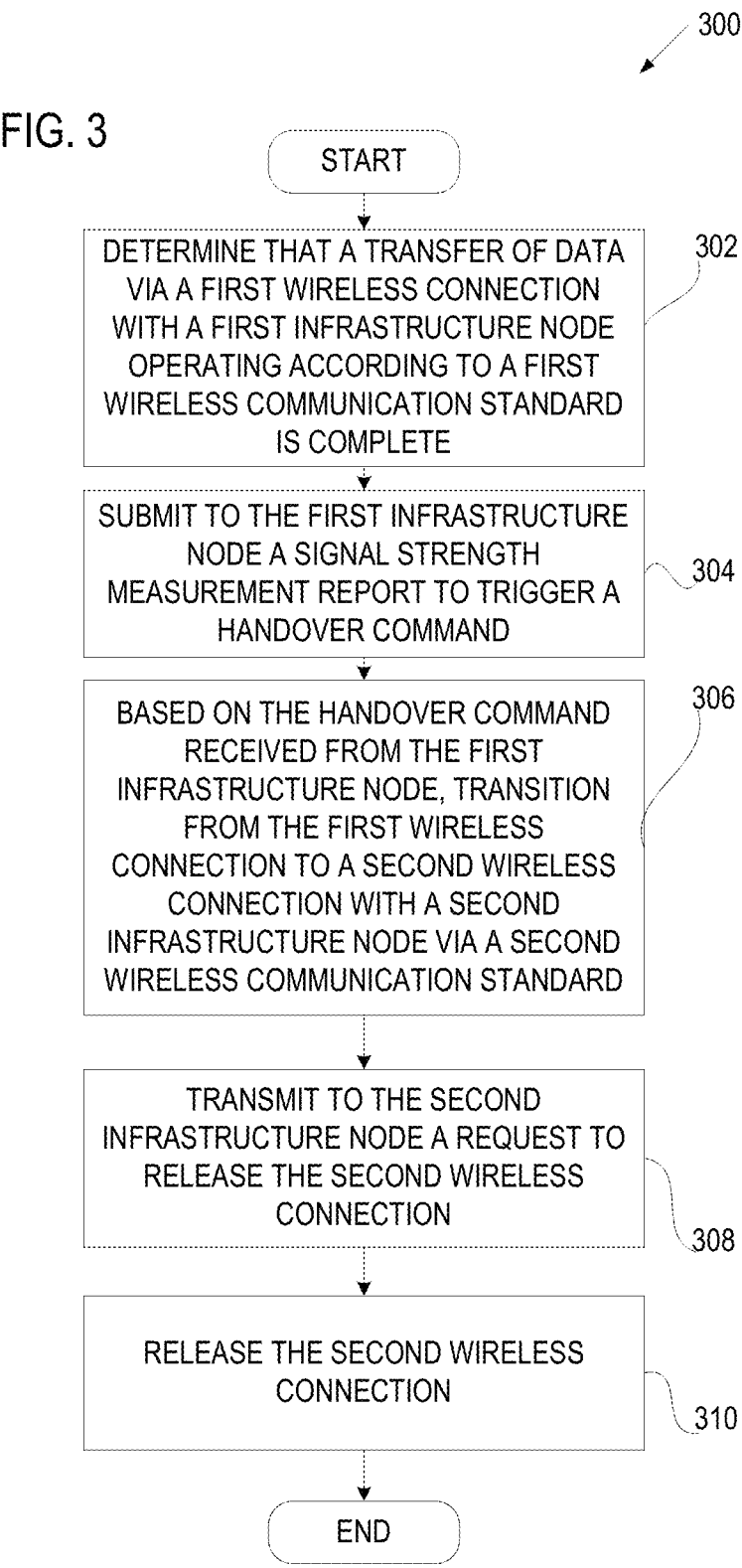
FIG. 3 illustrates a flow diagram of one embodiment of a method for releasing a wireless connection using a signal measurement report.
Figure 4:
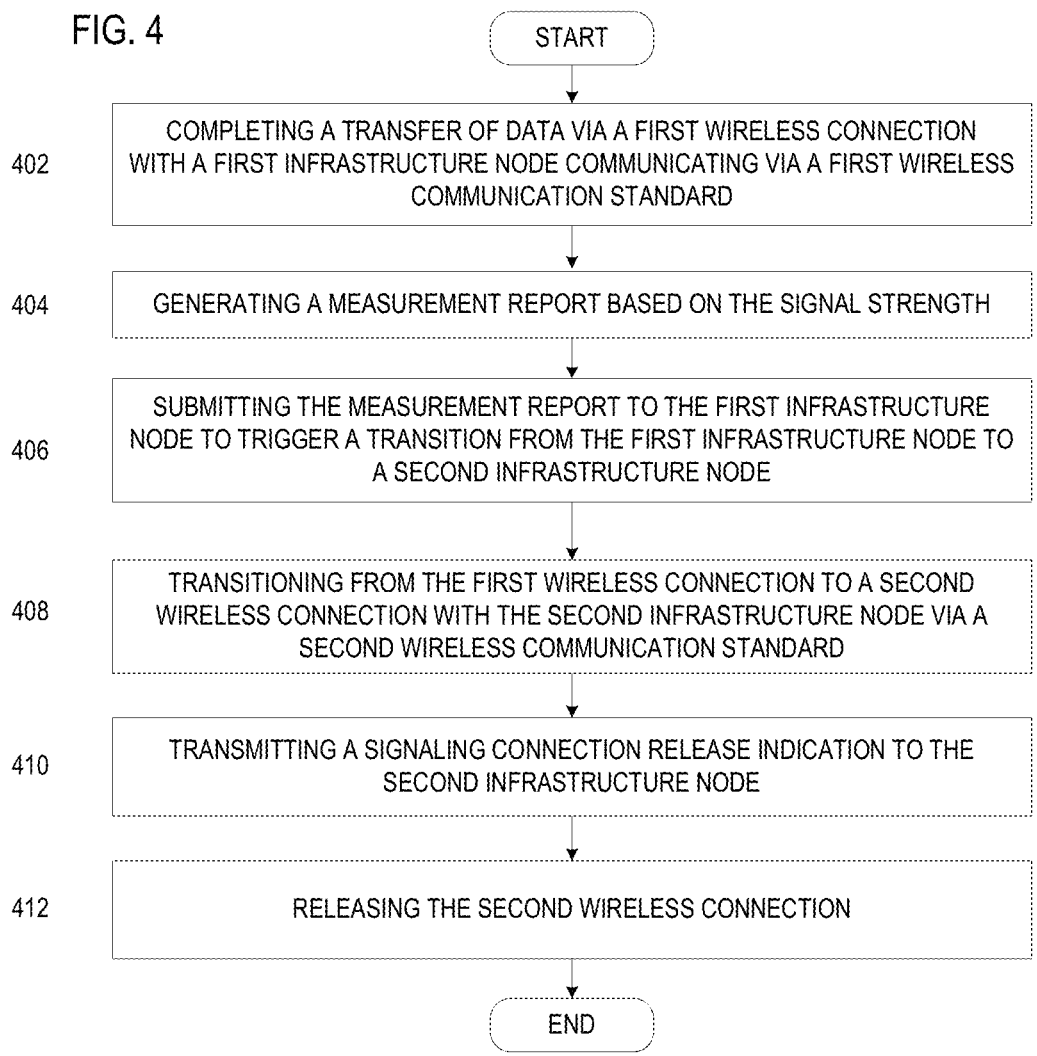
FIG. 4 illustrates a flow diagram of one embodiment of a method for transferring data and triggering fast dormancy when the data transfer is complete.

FIGS. 3 and 4 are flow diagrams of some embodiments of client-side methods. The methods are performed by processing logic that may comprise hardware (circuitry, dedicated logic, etc.), software (such as is run on a general purpose computer system or a dedicated machine), or a combination of both. In one embodiment, the methods are performed by a user device (e.g., a fast dormancy subsystem 104 of user device 102 of FIG. 1).

FIG. 3 illustrates a flow diagram of one embodiment of a method for releasing a wireless connection using a signal measurement report. An example system implementing this method determines that a transfer of data via a first wireless connection with a first infrastructure node is complete (302). The first infrastructure node may be wireless communication hardware servicing an area known as a cell, the node operating according to a first wireless communication standard. The first wireless communication standard can be LTE or any other standard that does not recognize or implement connection release indications (e.g., signaling connection release indications (SCRI)) from user equipment communications devices and cause user devices to relay on other mechanisms (e.g., a dormancy timer) to terminate wireless connections for which data transmissions are complete.

The system submits to the first infrastructure node a signal strength measurement report to trigger a handover command (304). Prior to submitting the signal strength measurement report, the system can check for available infrastructure nodes operating according to a second wireless communication standard. The second wireless communication standard can be CDMA, WCDMA or any other standard that recognizes connection release indications (e.g., signaling connection release indications (SCRI)) from user equipment communications devices that can use these connection release indications to terminate wireless connections for which data transmissions are complete. The signal strength measurement report can be accurate, semi-accurate, or completely fabricated. The contents of the signal strength report may not be important outside of the consequence that the signal strength report triggers a handoff from the first wireless connection to a second wireless connection. For example, the system can generate the signal strength measurement report based on a signal strength of the second infrastructure node, or can generate the signal strength measurement report using a default measurement not related to a signal strength of the second infrastructure node.

Based on a handover command received from the first infrastructure node, the network operator allows the system to transition from the first wireless connection to a second wireless connection with a second infrastructure node according to a second wireless communication standard (306). For example, the system sends the measurement report to an LTE network node, which triggers the LTE network node to request the network operator to transition the user device to an available WCDMA node.

The system transmits to the second infrastructure node a request to release the second wireless connection (308) and the system releases the second wireless connection (310). The system takes advantage of the features of the second wireless communication standard (e.g., WCDMA standard) that provide for voluntarily entering an idle state. The system can save power in this way by avoiding waiting for the entire LTE dormancy timeout period to enter an idle state. After transitioning to the second wireless connection and prior to transmitting the request to release the second wireless connection, the system can wait for a delay period. The system can enter the idle state according to the first wireless communication standard and/or the second wireless communication standard after releasing the second wireless connection. The system can determine whether the first infrastructure node is still available, and if the first infrastructure node is still available, enter idle mode in association with the first infrastructure node. If the first infrastructure node is not available, the system can enter idle mode in association with the second infrastructure node. If the system determines that the infrastructure node associated with the first wireless communication standard is available, the system can enter idle mode associated with the first wireless communication standard. If the system determines that the infrastructure node associated with the first wireless communication standard is not available, the system can enter idle mode associated with the second wireless communication standard.

FIG. 4 illustrates a flow diagram of another embodiment of a method for transferring data and triggering fast dormancy when the data transfer is complete. An example system implementing the method completes a transfer of data via an LTE wireless connection with an LTE infrastructure node (402). The system generates a measurement report, optionally based on actual or reported signal strength(s) (404), and submits the measurement report to the LTE infrastructure node to trigger a transition from the LTE infrastructure node to a WCDMA infrastructure node (406).

The system transitions from the LTE wireless connection to a WCDMA wireless connection with the WCDMA infrastructure node (408). The system transmits a signaling connection release indication (SCRI) to the WCDMA infrastructure node (410). After the SCRI is successfully processed by the WCDMA infrastructure, the system is allowed to release the second wireless connection (412). The WCDMA infrastructure can send a release indication and upon receiving this indication, the system is allowed to release the second wireless connection.

Other solutions to the problem of increased energy consumption in LTE devices may include creating an artificial radio link failure on the user device when in LTE connected state. The user device would release all radio resources from its end and move to LTE idle without informing the network or coordinating with the network. The network would eventually detect a radio link failure for this user device at a later time, and then release radio resources on its end. While this solution conserves battery life on the user device, between the time the user device releases radio resources and moves to an LTE idle state and when the network detects the radio link failure, the network will be unable to reach the user device, for example to send a page to the user device, because the network thinks the user device is in LTE connected state when user device is actually in LTE idle. So this approach could result in missed pages. Creating an artificial link failure may apply to data-only user devices where missing a page might not be as serious an issue as for voice devices. The second problem is that radio resources on the network would be blocked until the network detects the radio link failure for the user device. The solutions outlined above allow an LTE-enabled device to transition from LTE to WCDMA, and use existing WCDMA mechanisms, such as SCRI, to gracefully enter an idle state, thereby avoiding the problems associated with simply entering an LTE idle state without informing or coordinating with the network.

FIG. 6 illustrates example interactions 600 related to fast dormancy between a user device and an LTE wireless network and a WCDMA wireless network. The user equipment (UE) 602 starts out in an LTE idle state 608 with the LTE node, eNodeB 604. UE 602 initiates a connection to transmit or receive data by sending a radio resource control (RRC) connection request 610 to eNodeB 604. eNodeB 604 replies with an RRC connection setup 612, and UE 602 confirms that the RRC connection setup is complete 614. This process transitions UE 602 from the LTE idle state 608 to an LTE connected state 616. Once the user device completes transmitting or receiving data in the LTE connected state 616, the user device can initiation fast dormancy 618.

As part of fast dormancy 618, the user device searches for any suitable available WCDMA cell (served or provisioned by base station subsystem or radio station subsystem, or BSS/RNS 606) and can measure the signal strength of the available WCDMA cell. The user device can build and send a measurement report about the available WCDMA cell regardless of whether signal strength of BSS/RNS 606 is stronger than signal strength of the LTE cell served by eNodeB 604 associated with the LTE connected state 616. The user device sends the measurement report 622 to eNodeB 604. eNodeB 604 treats the measurement report as an indication that the user device has found a more suitable BSS/RNS 606 with stronger signal strength, regardless of the contents or accuracy of the measurement report. In response to the measurement report 622, eNodeB 604 initiates a handover 624 to the available WCDMA cell, and transitions from an LTE connected state 616 to a WCDMA connected state 626.

After the handover is complete 628 and the user device is in the WCDMA connected state 626, the user device sends a signaling connection release indication (SCRI) 630 to the WCDMA cell. The WCDMA cell releases the connection 632, and the user device acknowledges the release 634. The user device can reselect back to the previously camped eNodeB 604 or any other LTE node. If no LTE cells are available, the user device can remain idle on the WCDMA cell 636. The user device then enters either an LTE or a WCDMA idle state 638, depending on which cells(s) are available with which to associate the idle state. At this point, the user device has gracefully transitioned from the LTE connected state 616 to a WCDMA connected state 626 and to an idle state 638 without waiting for the LTE dormancy timer to run and without causing other network problems. The power savings can be approximated by the power consumption rate of the LTE transmitter and receiver times the difference between the remainder of the LTE dormancy timer and the amount of time required to transition to the idle state 638 after the measurement report 622. Given that one typical value for the LTE dormancy timer is 60 seconds, the power savings can be considerable.

Figure 5:
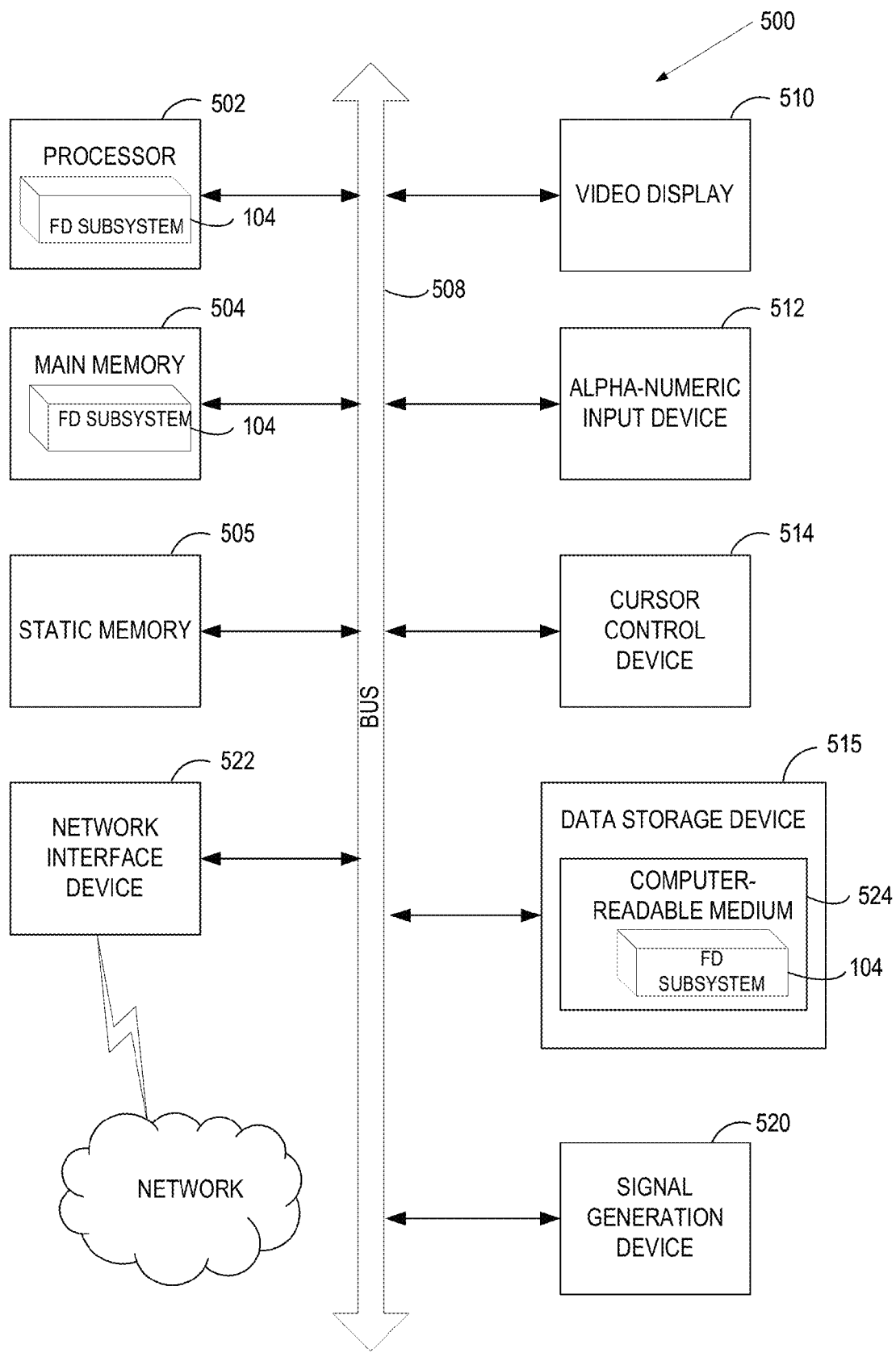
FIG. 5 illustrates a block diagram of one embodiment of a user device.

FIG. 5 is a block diagram illustrating an exemplary user device 500. The user device 500 may be the same as user device 102 of FIG. 1 and may be any type of computing device such as an electronic book reader, a PDA, a mobile phone, a laptop computer, a portable media player, a tablet computer, a camera, a video camera, a netbook, a desktop computer, a gaming console, a DVD player, a media center, and the like.

The user device 500 includes one or more processing devices 504, such as one or more CPUs. The user device 500 also includes system memory 506, which may correspond to any combination of volatile and/or non-volatile storage mechanisms. The system memory 506 may store information which provides an operating system component 508, various program modules 510 including fast dormancy subsystem 104, program data 512, and/or other components. The user device 500 performs functions by using the processing unit(s) 504 to execute the fast dormancy subsystem 104 and other instructions provided by the system memory 506.

The user device 500 may also include a data storage device 514 that may consist of one or more types of removable storage and/or one or more types of non-removal storage. The data storage device 514 may include a computer-readable medium 516 on which is stored one or more sets of instructions (e.g., instructions of the fast dormancy subsystem 104) embodying any one or more of the methodologies or functions described herein. As shown, instructions of the fast dormancy subsystem 104 may also reside, completely or at least partially, within the system memory 506 and/or within the processing unit(s) 530 during execution thereof by the user device 500, the system memory 506 and the processing unit(s) 530 also constituting computer-readable media. The instructions of the fast dormancy subsystem 104 may further be transmitted or received over a network.

The user device 500 may also include one or more input devices 518 (keyboard, mouse device, specialized selection keys, etc.) and one or more output devices 520 (displays, printers, audio output mechanisms, etc.). The user device 500 may further include a wireless modem 522 to allow the user device 500 to communicate via a wireless network with other computing devices 524, such as remote computers, the service provider server 104, and so forth. The wireless modem 522 may allow the user device 500 to receive a voice call and also communicate with the service provider server 104 in a data mode. The wireless modem 522 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 500. As indicated by the label "Other Device Functionality" 528, the user device 500 may include additional functions.

In some embodiments, the device can initiate fast dormancy to trick the network to hand over from LTE to WCDMA, for example, based on battery level or application type. For example, assuming that LTE transmissions use more power than WCDMA transmissions, the user device can generate and submit a measurement report regardless of actual signal strength to force a transition from LTE to WCDMA. In another embodiment, an application sending data may not have sufficient benefit from the faster speeds of LTE versus WCDMA. Thus, when that application is operating and transmitting data via the wireless network, the user device can submit a measurement report to transition to a lower power wireless network. In yet another embodiment, the user device can look to any trigger or condition as a signal to send a measurement report and transition between two networks. Some example triggers or conditions can include availability of an 802.11x wireless network, remaining battery level, user preferences, location data, network affinity, subscriber or subscription details, and so forth. Regardless of whether the actual signal strength of the cell to transition to, these triggers or conditions can signal to the user device to generate a signal strength measurement report, causing the network infrastructure to transition the user device from one wireless network interface to another wireless network interface.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   transferring, by a communication device, data via a first wireless connection between a user device and a first infrastructure node communicating according to a first wireless communication standard;
   identifying a second infrastructure node communicating according to a second wireless communication standard;
   generating, irrespective of actual signal strength values of the first infrastructure node and the second infrastructure node, a measurement report indicating a weaker signal strength of the first infrastructure node compared to a signal strength of the second infrastructure node, to trigger a handover from the first infrastructure node to the second infrastructure node;
   submitting the measurement report to the first infrastructure node;
   in response to receiving an acknowledgement of the measurement report from the first infrastructure node, transitioning from the first wireless connection to a second wireless connection with the second infrastructure node;
   transmitting a connection release request to the second infrastructure node;
   upon receiving a response to the connection release request, releasing the second wireless connection to enter an idle state;
   determining that the first infrastructure node is available; and
   associating the communication device with the first infrastructure node while the communication device remains in the idle state.

2. The method of claim 1, further comprising waiting a period of time prior to transmitting the connection release request.

3. The method of claim 1, wherein the user device in the idle state remains associated with the second infrastructure node but is not transmitting data to the second infrastructure node.

4. The method of claim 1 wherein the user device in the idle state remains associated with the first infrastructure node but is not transmitting data to the first infrastructure node.

5. The method of claim 1, wherein the first wireless communication standard is Long Term Evolution (LTE), and the second wireless communication standard is Code Division Multiple Access (CDMA) or Wideband Code Division Multiple Access (WCDMA).

6. The method of claim 1, wherein the first infrastructure node operating according to the first wireless communication standard does not recognize connection release requests from user devices.

7. The method of claim 1, wherein generating the measurement report is performed based on a default measurement value.

8. A system comprising:
   a processing device;
   a memory to store instructions which, when executed by the processing device, cause the processing device to:
   determine that a transfer of data, via a first wireless connection with a first infrastructure node operating according to a first wireless communication standard, is complete;
   send to the first infrastructure node a signal strength measurement report indicating, irrespective of actual signal strength values of the first infrastructure node and a second infrastructure node, a weaker signal strength of the first infrastructure node compared to a signal strength of the second infrastructure node, to trigger a handover from the first infrastructure node to the second infrastructure node;
   in response to a handover command received from the first infrastructure node, transition from the first wireless connection to a second wireless connection with the second infrastructure node according to a second wireless communication standard;
   release the second wireless connection after submitting a connection release to the second infrastructure node to enter an idle state;
   determine that the first infrastructure node is available; and
   associate the system with the first infrastructure node while the system remains in the idle state.

9. The system of claim 8, wherein the instructions, when executed by the processing device, further cause the processing device to: generate the signal strength measurement report using a default measurement that is unrelated to actual signal strength of the second infrastructure node.

10. The system of claim 8, wherein the first wireless communication standard is Long Term Evolution (LTE), and the second wireless communication standard is Code Division Multiple Access (CDMA) or Wideband Code Division Multiple Access (WCDMA).

11. The system of claim 10, wherein the first infrastructure node operating according to the first wireless communication standard does not recognize connection release requests from user devices.

12. The system of claim 8, wherein the instructions, when executed by the processing device, further cause the processing device to:
  wait for a period of time after transitioning to the second wireless connection and prior to transmitting the request to release the second wireless connection.

13. The system of claim 8, wherein the processing device in the idle state remains associated with one of the first infrastructure node or the second infrastructure node but is not transmitting data to the first infrastructure node or the second infrastructure node.

14. The system of claim 8, wherein the instructions, when executed by the processing device, further cause the processing device to:
  prior to submitting the signal strength measurement report, check for available infrastructure nodes operating according to the second wireless communication standard.

15. The system of claim 8, wherein the instructions, when executed by the processing device, further cause the processing device, after releasing the second wireless connection, to:
  upon determining that the first infrastructure node is not available, enter idle state in association with the second infrastructure node, wherein the processing device in the idle state remains associated with the second infrastructure node but is not transmitting data to the second infrastructure node.

16. The system of claim 8, the instructions, when executed by the processing device, further causing the processing device, after releasing the second wireless connection, to:
  upon determining that an infrastructure node operating according to the first wireless communication standard is not available, enter idle mode associated with the second wireless communication standard, wherein the processing device in the idle mode remains associated with the infrastructure node but is not transmitting data to the infrastructure node.

17. A non-transitory computer-readable storage medium having stored therein instructions which, when executed by a computing device, cause the computing device to perform a method comprising:
  upon receiving an indication that a data transfer via an active wireless connection with a first infrastructure node according to a first wireless communication standard is complete, generating, by the computing device, a signal strength measurement report indicating a weaker signal strength of the first infrastructure node compared to a signal strength of a second infrastructure node, irrespective of actual signal strength values of the first infrastructure node and the second infrastructure node;
  submitting the signal strength measurement report to the first infrastructure node to trigger a handover to the second infrastructure node;
  upon receiving a handover signal from the first infrastructure node in response to the signal strength measurement report, transitioning to the second infrastructure node to yield a second wireless connection according to a second wireless communication standard;
  transmitting to the second infrastructure node a request to enter an idle state;
  determining that the first infrastructure node is available; and
  associating the computing device with the first infrastructure node while the computing device remains in the idle state.

18. The non-transitory computer-readable storage medium of claim 17, wherein the signal strength measurement report is generated based on an available infrastructure node communicating according to the second wireless communication standard.

19. The non-transitory computer-readable storage medium of claim 17, wherein the first wireless communication standard is Long Term Evolution (LTE), and the second wireless communication standard is Code Division Multiple Access (CDMA) or Wideband Code Division Multiple Access (WCDMA).

20. The non-transitory computer-readable storage medium of claim 17, wherein the computing device in the idle mode remains associated with the first infrastructure node or the second infrastructure node, but is not transmitting data to the first infrastructure node or the second infrastructure node.

* * * * *